United States Patent
Marupaduga et al.

(10) Patent No.: US 10,264,596 B1
(45) Date of Patent: Apr. 16, 2019

(54) METHOD AND SYSTEM FOR CONTROLLING WCD CORE-NETWORK CONNECTION BASED ON COMMUNICATIONS SERVED BY BASE STATION FOR WHICH WCD PROVIDES WIRELESS BACKHAUL CONNECTIVITY

(71) Applicant: Sprint Spectrum L.P., Overland Park, KS (US)

(72) Inventors: Sreekar Marupaduga, Overland Park, KS (US); Vanil Parihar, Overland Park, KS (US); Nitesh Manchanda, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 108 days.

(21) Appl. No.: 15/466,008

(22) Filed: Mar. 22, 2017

(51) Int. Cl.
 *H04W 72/12* (2009.01)
 *H04W 60/06* (2009.01)
 *H04W 60/00* (2009.01)
 *H04W 24/10* (2009.01)
 *H04B 7/155* (2006.01)
 *H04W 24/08* (2009.01)
 *H04W 88/16* (2009.01)
 *H04W 88/04* (2009.01)
 *H04W 92/10* (2009.01)

(52) U.S. Cl.
 CPC .... *H04W 72/1252* (2013.01); *H04B 7/15507* (2013.01); *H04W 24/08* (2013.01); *H04W 24/10* (2013.01); *H04W 60/00* (2013.01); *H04W 60/06* (2013.01); *H04W 88/04* (2013.01); *H04W 88/16* (2013.01); *H04W 92/10* (2013.01)

(58) Field of Classification Search
 None
 See application file for complete search history.

(56) References Cited

U.S. PATENT DOCUMENTS

| | | | |
|---|---|---|---|
| 6,871,074 B2 | 3/2005 | Harris et al. | |
| 7,289,480 B2 | 10/2007 | Laundstrom et al. | |
| 7,436,779 B1 | 10/2008 | Mangal et al. | |
| 2002/0172178 A1* | 11/2002 | Suzuki | H04W 76/38 370/338 |
| 2003/0189951 A1 | 10/2003 | Bi et al. | |
| 2014/0064134 A1* | 3/2014 | Huang | H04W 76/38 370/253 |
| 2015/0282009 A1* | 10/2015 | Iwai | H04W 24/10 455/436 |
| 2016/0366596 A1* | 12/2016 | Ofir | H04W 16/26 |
| 2017/0347302 A1* | 11/2017 | Li | H04W 16/04 |
| 2018/0220483 A1* | 8/2018 | Hayashi | H04W 16/32 |

* cited by examiner

*Primary Examiner* — Rebecca E Song

(57) ABSTRACT

A method and system to help manage a wireless client device's (WCD's) network connection with a core network gateway, where the WCD provides wireless backhaul connectivity to the core network for a relay base station with which the WCD communicates over a communication interface. The WCD detects passage of a threshold period of absence of communication on the communication interface between the WCD and the relay base station, and upon detecting that threshold period of absence of communication on that communication interface, the WCD releases its network connection with the core network gateway. Further, the WCD dynamically sets the threshold inactivity period for this purpose based on history of communications with which the relay base station has served one or more other WCDs.

18 Claims, 4 Drawing Sheets

42 — WCD RELEASES ITS NETWORK CONNECTION WITH A GATEWAY VIA A FIRST BASE STATION UPON THE WCD DETECTING PASSAGE OF A THRESHOLD INACTIVITY PERIOD OF NO COMMUNICATION ON THE COMMUNICATION INTERFACE BETWEEN THE WCD AND A SECOND BASE STATION

44 — WCD DYNAMICALLY SETS THE THRESHOLD INACTIVITY PERIOD BASED ON HISTORY OF COMMUNICATIONS WITH WHICH THE SECOND BASE STATION SERVES ONE OR MORE OTHER WCDS

METHOD AND SYSTEM FOR CONTROLLING WCD CORE-NETWORK CONNECTION BASED ON COMMUNICATIONS SERVED BY BASE STATION FOR WHICH WCD PROVIDES WIRELESS BACKHAUL CONNECTIVITY

BACKGROUND

A typical wireless communication system includes a number of base stations each radiating to provide coverage in which to serve wireless client devices (WCDs) such as cell phones, tablet computers, tracking devices, embedded wireless modules, and other wirelessly equipped devices, whether or not user operated. In turn, each base station may sit as a node on a core network including entities such as a network controller and a gateway system that provides connectivity with an external transport network such as the Internet. With this arrangement, a WCD within coverage of the system may engage in air interface communication with a base station and may thereby communicate via the base station with various remote network entities or with other WCDs served by the base station.

Such a system may operate in accordance with a particular radio access protocol, examples of which include, without limitation, Long Term Evolution (using Orthogonal Frequency Division Multiple Access (OFDMA) and Single Carrier Frequency Division Multiple Access (SC-FDMA)), Code Division Multiple Access (CDMA) (e.g., 1×RTT and 1×EV-DO), Global System for Mobile Communications (GSM), IEEE 802.11 (WIFI), BLUETOOTH, and others. Each protocol may define its own procedures for registration of WCDs, initiation of communications, handover between base station coverage areas, and other functions.

Further, each base station may provide wireless service to WCDs on one or more carrier frequencies (carriers), each of which could be frequency division duplex (FDD), defining separate frequency channels for downlink and uplink communication, or time division duplex (TDD), defining a frequency channel multiplexed over time between downlink and uplink use. Each carrier or its respective channels could be within a defined frequency band and could be of a particular frequency bandwidth, such as 5 MHz, 10 MHz, or 20 MHz for instance, defining a certain extent of air interface resources.

When a WCD initially powers on within such a system, the WCD may scan various carriers in search of base station coverage, and upon detecting strong enough coverage, the WCD may engage in an access process to establish a radio-link layer connection with the base station, and the WCD may then engage in an attach process through which the system becomes configured to serve the WCD. In an example attach process, for instance, the WCD may transmit an attach request over the air to the base station, and the base station may forward the attach request to the network controller in the core network. After authenticating and authorizing the WCD, the network controller may then then engage in signaling with the base station and with the gateway system, to coordinate and trigger establishment of a network connection for the WCD.

This process may result in setup of a network connection, including at least one bearer (data tunnel), between the WCD and the gateway system via the base station, with a Dynamic Host Control Protocol (DHCP) server assigning to the WCD an Internet Protocol (IP) address usable by the WCD to engage in packet-data communication on the transport network. In particular, the network connection could define a particular access point name (APN) connection that is associated with external transport-network connectivity and communication. Further, the process may result in creation and storage at various core network entities of a context record for the WCD, identifying the WCD's network connection, bearer identity, and other information to facilitate serving the WCD.

Once a WCD is so attached, the base station may then provide the WCD with wireless data communication service. In an example arrangement, for instance, when data arrives on the transport network destined to the WCD's IP address, the gateway system may transmit the data via the WCD's bearer to the base station, and the base station may then schedule downlink air interface resources to carry the data to the WCD and transmit the data to the WCD accordingly. Likewise, when the WCD has data to transmit on the transport network, the WCD may send a scheduling request to the base station, the base station may schedule uplink air interface resources to carry the data from the WCD, and upon receipt of the data at the base station, the base station may then transmit the data via the WCD's bearer to the gateway system for transmission on the transport network.

Further, when a base station operates in such a system, the base station may engage in various types of communication with other core network entities. For instance, the base station could engage in control-plane communication, encompassing encompasses any of the base station's control signaling with other core network entities to help manage operations in the system and service of WCDs, and could thus include communications such as bearer setup signaling, tracking area update signaling, paging, handover signaling, the like. Further, the base station could engage in user-plane communication, encompassing bearer data (e.g., application data, user data, etc.) being communicated to or from one or more WCDs served by the base station, such as packet data that the base station receives from the gateway system and then schedules/transmits to a WCD and packet data that the base station receives from a WCD and forwards to the gateway system for transmission on a transport network.

OVERVIEW

Optimally, a wireless service provider will strategically implement base stations throughout a market area so that served WCDs can move between the base stations' coverage areas without loss of coverage. Each base station may include an antenna structure and associated equipment, and the wireless service provider may connect the base station by a landline cable (e.g., a T1 line) with the service provider's core network, to enable the base station to communicate with the network controller, the gateway system, other base stations, and the like.

In practice, however, it may be impractical for a wireless service provider to run landline connections to base stations in certain locations. For instance, where a service provider seeks to provide many small coverage areas blanketing a market area or to fill in coverage holes between coverage of other base stations, the service provider may implement many small-cell base stations throughout the market area, but it may be inefficient or otherwise undesirable to run landline cables to every one of those small-cell base stations.

To connect a base station with the core network in such a situation, the wireless service provider may implement a wireless relay backhaul connection in which the base station includes or is interconnected via a communication interface (e.g., an Ethernet cable or local area network (LAN)) with a special WCD that is served by a base station already connected with the core network. With this arrangement, the core-network-connected base station can be referred to as a "donor base station," the special WCD can be referred to as a "relay-WCD," and the base station at issue can be referred to as a "relay base station." In operation, the donor base station would serve the relay-WCD in much the same way as any base station would serve a WCD, communications would pass between the relay-WCD and the relay base station over their communication interface, and the relay base station would serve other WCDs in much the same way as any base station would.

To enable the relay base station in this arrangement to communicate with other core network entities (such as the network controller, the gateway system, and other base stations), the service provider may implement a relay-gateway system or the like within the core network and may configure a communication path between the relay base station and the relay-gateway system. (In practice, the relay-gateway system could be integrated with the gateway system discussed above but could serve to provide local core network connectivity rather than external transport network connectivity.)

In particular, when the relay-WCD first powers on within the wireless communication system, the relay-WCD may operate as described above, scanning for coverage, engaging in an access process to establish a radio-link layer connection with a donor base station, and then engaging in an attach process through which the system would become configured to serve the relay-WCD.

In its attach request, however, the relay-WCD may include a special identifier indicating that the relay-WCD is a relay-WCD rather than a conventional end-user WCD. And upon receipt of that attach request, the network controller may thus determine that the relay-WCD is a relay-WCD and, in response, may coordinate, trigger, or facilitate setup for the relay-WCD of a network connection with the relay-gateway system rather than with the conventional gateway system—namely, an APN connection associated with local core network connectivity and communication. In particular, this process may result in setup for the relay-WCD of at least one bearer between the relay-WCD and the relay-gateway system, with a DHCP server assigning to the relay-WCD an IP address useable by the relay-WCD to engage in packet-data communication locally within the core network. And the process may result in creation and storage at various core network entities of a context record for the relay-WCD, identifying the relay-WCD's network connection, bearer identity, and other information to facilitate serving the relay-WCD.

With this arrangement, when the relay base station powers on, the relay base station could broadcast a DHCP DISCOVER request to seek IP address assignment, and the relay-WCD could receive that DHCP DISCOVER request via its communication interface with the relay-WCD. In response to this DHCP DISCOVER request, if not earlier, the relay-WCD could engage in an additional attach process with the core network, triggering establishment of an APN connection specifically for the relay base station's use to engage in communication with entities on the core network. And in this process, the relay-WCD could forward the relay base station's DHCP DISCOVER request to the relay-gateway system, and a DHCP server could responsively assign to the relay base station an IP address useable by the relay base station to engage in packet-data communication locally within the core network.

With this arrangement in place, the relay base station could then engage in communication with other core network entities (e.g., with the network controller, the conventional gateway system, and other base stations) as any other base station would do, including control-plane and user-plane communications. However, any such communications would pass via the relay-WCD and the relay base station's APN connection with the relay-gateway system.

For instance, a communication from the relay base station to another core network entity would pass from the relay base station to the relay-WCD via their communication interface (e.g., Ethernet cable or LAN), the donor base station would coordinate uplink transmission of the communication from the relay-WCD, the communication would then pass from the donor base station to the relay-gateway system, and the communication would pass from the relay-gateway system to the destination other core network entity. Likewise, a communication from another core network entity to the relay base station would pass to the relay-gateway system, to the donor base station, over the air to the relay-WCD, and via the communication interface from the relay-WCD to the relay base station.

In practice, the relay-WCD's established APN connection with the core network could consume limited network resources. For instance, the donor base station, gateway system, and/or one or more other core network entities may support up to only a limited number of bearers, context records, IP address assignments, and/or other resources, and the relay-WCD's APN connection would thus consume some of those limited resources. Consequently, if a relay-WCD is not being used to provide core-network backhaul connectivity for a relay base station, it could be advantageous to release the relay-WCD's APN connection so as to help conserve network resources.

To manage this, the relay-WCD could be configured to detect the passage of a threshold period of time of no communication occurring on its communication interface with the relay base station, which might indicate that the relay base station has been disconnected or is otherwise out of service. And the relay-WCD could be configured to respond to such threshold absence of communication with the relay base station by releasing the relay-WCD's APN connection. For instance, upon detecting a threshold period of inactivity on its communication interface with the relay base station, the relay-WCD could transmit to the donor base station a detach request for the relay-WCD's APN connection, which could pass to the network controller to trigger teardown of the relay-WCD's APN connection, including release of its bearer connection, release of its IP address assignment, and deletion of associated context records. Further, the relay-WCD could also similarly detach and trigger release of the APN connection that was established for the relay base station.

On the other hand, it could also be important for the relay-WCD to maintain its APN connection and to provide backhaul connectivity for the relay base station promptly when necessary. For instance, even if the relay base station has not communicated with other entities on the core network for some time, the relay base station may be called upon to do so if an end-user WCD enters into coverage of the relay base station and seeks to attach and engage in packet-data communication. If the relay-WCD has released its APN connection with the core network and the relay base station then seeks to communicate via the relay-WCD, the relay-WCD would then need to responsively establish an APN connection anew. Namely, the relay-WCD would need to again scan for coverage of a donor base station, and upon finding such coverage then engage in the access and attach processes as described above, to establish an APN connection with the relay-gateway system. Further, the relay-WCD may need to again attach and establish an APN connection for the relay base station. Yet all of this processing could unduly delay the relay base station's communication with the core network, which could present user experience issues.

To manage these concerns, the relay base station could be configured to transmit periodic keepalive messages to the relay-WCD over the communication interface between the relay base station and the relay-WCD, with the keepalive transmission period being shorter than the threshold inactivity period that the relay-WCD is set to wait before releasing its APN connection. In this manner, assuming the relay base station is still up and running, even though it is not engaged in communication on the core network, the relay-WCD would maintain its APN connection and be able to provide backhaul connectivity for the relay base station when necessary. On the other hand, if the relay base station powers down or otherwise goes out of service for maintenance or other reasons, the keepalive messages would cease, and upon detecting passage of the threshold period of inactivity on the communication interface between the relay-WCD and the relay base station, the relay-WCD could then release its APN connection, to help conserve network resources.

At issue in this process, however, is what threshold inactivity period the relay-WCD should use for gauging absence of communication between the relay-WCD and the relay base station, as a trigger for releasing the relay-WCD's APN connection with the core network. (This threshold inactivity period could be measured in terms of duration of time and/or number of missed keepalive messages from the relay base station for instance.) If the inactivity period is too short, then the relay-WCD could release its APN connection at a time when the relay-WCD's services might soon be needed, which would then give rise to the problematic startup delay noted above. Whereas, if the inactivity period is too long, then the relay-WCD's APN could unnecessarily continue to consume limited network resources.

Disclosed herein is a method and system to help address this issue. In accordance with the disclosure, the relay-WCD will dynamically set the threshold inactivity period at issue based on a history of communications with which the relay base station serves one or more other WCDs (e.g., end-user WCDs served by the relay base station). In particular, the relay-WCD or another entity could determine what times of day the relay base station tends to serve such communications, and the relay-WCD could set itself to apply a longer threshold inactivity period at those times of day and a shorter threshold inactivity period at other times of day. Further, this process could address specific types of communications served by the relay base stations, such as high-service-level communications like voice calls or the like.

By applying a longer threshold inactivity period at times of day when the relay base station tends to serve such communications (e.g., high priority communications like voice), the relay-WCD could help to minimize or avoid the delay that would occur as a result of the relay-WCD needing to re-attach when the relay base station seeks to communicate on the core network. Whereas, by applying a shorter threshold inactivity period at times of day when the relay base station tends to not serve such communications, the relay-WCD could help to conserve network resources by more promptly releasing its APN connection.

To facilitate this process in practice, the relay-WCD could receive reports from the relay base station or from a core network element management system (EMS) server indicating times of day when the relay base station has served communications, perhaps per service or priority level, or the relay-WCD could discern such information through deep packet inspection of communications to or from the relay base station. And based on this information, the relay-WCD could dynamically set the threshold inactivity period for absence of communication on the interface between the relay-WCD and the relay base station. Alternatively, another entity could evaluate such information and could direct the relay-WCD what threshold inactivity periods to apply from time to time.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present disclosure will focus on application in the context of LTE as an example radio access protocol and associated network arrangement. However, it will be understood that principles of the disclosure can extend to apply in other scenarios as well, such as with respect to other radio access protocols. Further, even within the context of LTE, variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processing unit executing software instructions for instance.

Figure 1:
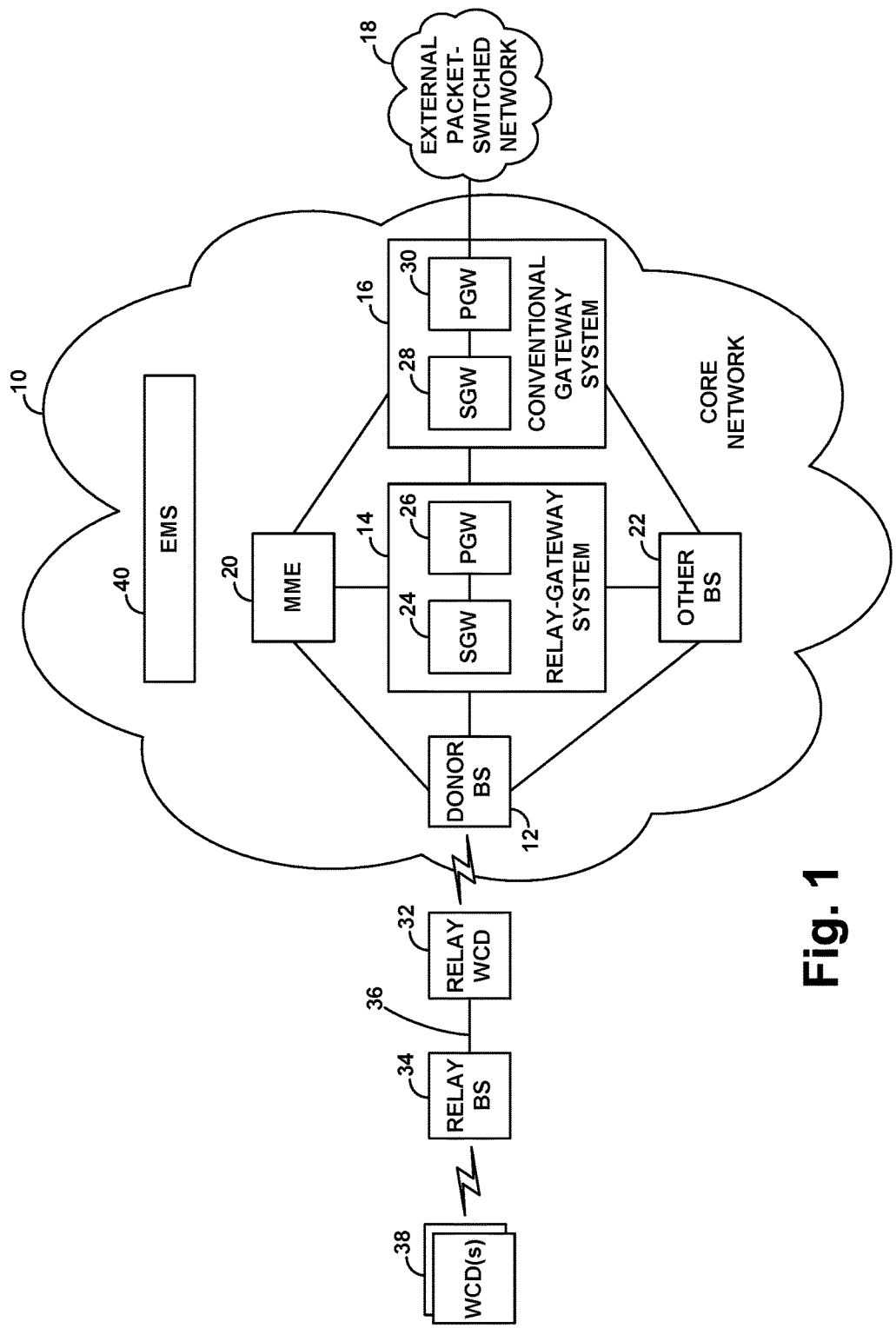
FIG. 1 is a simplified block diagram of an example wireless communication system in which features of the present disclosure can be implemented.

Referring to the drawings, as noted above, FIG. 1 is a simplified block diagram of an example wireless communication system in which features of the present disclosure can be implemented. In particular, FIG. 1 depicts a representative LTE core network 10, which functions primarily to serve WCDs with wireless packet data communication service, including possibly voice-over-packet service, but may also provide other functions. The core network 10 may be a packet-switched network, compliant with the industry standard system architecture evolution (SAE) for the LTE protocol, and thus the entities shown on the core network may each have an IP address and be configured to communicate with each other over packet-based tunnels or other communication interfaces.

As shown, network 10 includes an example donor base station (BS) 12, which has an antenna structure and associated equipment (not shown) for providing LTE coverage in which to serve the WCDs. The donor base station 12 then has a communication interface with an example relay-gateway system 14, which provides connectivity locally within the core network, to facilitate communication with other core network entities such as (i) a conventional gateway system 16 that provides connectivity with an external packet-switched network 18, (ii) a mobility management entity (MME) that functions as a network controller, and (iii) another representative base station 22.

The relay-gateway system 14 is shown by way of example including a serving gateway (SGW) 24 and a packet-data network gateway (PGW) 26. In practice, the SGW 24 may be the component of the relay-gateway system that interfaces the donor base station 12, the SGW 24 may have a communication interface with the PGW 26, and the PGW 26 may then function as a gateway generally into the core network, to facilitate communication with the other core network entities.

Likewise, the conventional gateway system 16 is shown by way of example including an SGW 28 and a PGW 30. And in practice, the SGW 28 may be the component of the conventional gateway system that interfaces with base stations, the SGW 28 may have an interface with the PGW 30, and the PGW 30 may function as a gateway into the external packet-switched network 18, to facilitate communication on that network.

As noted above, the relay-gateway system and conventional gateway system could be integrated together but could serve these different purposes, with the relay-gateway system providing for internal core-network communication and the conventional gateway system providing for external transport network communication.

FIG. 1 additionally shows, within coverage of donor base station 12, a representative relay-WCD 32, which may be a conventional or specially configured WCD that is in place to provide wireless backhaul connectivity for at least one relay base station. Further, FIG. 1 shows a representative relay base station 34, which could be connected with relay-WCD 32 via an Ethernet cable, a LAN, or another communication interface 36, so as to attain wireless backhaul connectivity with the core network 10 via the relay-WCD. And FIG. 1 shows within the coverage of relay base station 34 one or more representative WCDs 36, which could be end-user WCDs and/or could be relay-WCDs connected with one or more additional relay base stations (not shown) to provide a daisy-chained relay configuration.

With this arrangement, the donor base station 12 serves the relay-WCD 32 over an air interface, the relay-WCD 32 functions as an intermediary between the donor base station 12 and the relay base station 34 via communication interface 36, and the relay base station 34 then serves one or more other WCDs. In particular, the relay-WCD uses its air interface with the donor base station as a wireless backhaul connection for the relay base station, including (i) receiving via the communication interface from the relay base station communications that are destined to the core network and transmitting the communications via the air interface to the donor base station for transmission into the core network and (ii) receiving from the donor base station via the air interface communications from the core network destined to the relay base station and passing those communications via the communication interface to the relay base station.

In addition, FIG. 1 shows the core network 10 including an element management system (EMS) server 40, which could be interconnected with various other network elements as noted above. The EMS could function to track network operation. For instance, as base stations serve WCDs with communications, the base stations could signal via the core network to the EMS to report initiation, status, and completion of such communications as well as various attributes of such communications, and the EMS could log that information. Further, the EMS could allow and respond to queries from entities on the core network, such as queries regarding communications served by base stations, and could process the logged data and carry out various other operations.

In line with the discussion above, when relay-WCD 32 powers on in this arrangement, the relay-WCD could scan various carriers and detect coverage of the donor base station 12, and the relay-WCD could then connect with base station 12 and engage in an attach process to establish a first APN connection with the relay-gateway system 14. In particular, the relay-WCD could transmit to the donor base station an attach request carrying an identifier that indicates the relay-WCD is a relay-WCD, and the donor base station could forward that attach request to the MME 20. In turn, MME could then engage in signaling with the donor base station and with the relay-gateway system (e.g., with the SGW 24, which could in turn engage in signaling with the PGW 26), to coordinate establishment for the relay-WCD of an APN for core network connectivity, including establishment of at least one bearer, assignment of a core-network IP address, and establishment of context records for the relay-WCD.

When the relay base station 34 is then powered on and in communication via interface 36 with the relay-WCD 32, the relay base station may broadcast a DHCP DISCOVER message carrying a client-ID of the relay base station and a media access control (MAC) address of the relay base station. And when the relay-WCD receives this DHCP DISCOVER request, the relay-WCD may then engage in another attach process as noted above, to establish a second APN connection with the relay-gateway system, this one specifically for the relay base station to be able to communicate within the core network.

For instance, the relay-WCD could transmit to the donor base station an attach request carrying an identification of the relay base station, and the donor base station could forward the attach request to the MME. And the MME could then engage in signaling with the donor base station and with the relay-gateway system to coordinate establishment of this additional APN for the relay base station's use, including establishment of at least one bearer, assignment of a core-network IP address, and establishment of context records for the relay-WCD.

In establishing this APN for the relay base station's use, a DHCP server could initially assign a dummy IP address (e.g., 0.0.0.0), pending receipt of a DHCP DISCOVER request from the relay base station. Once the APN is established, the relay-WCD could then forward to the relay-gateway system via a bearer of the APN, the DHCP DISCOVER message that the relay base station had provided, and the DHCP server could responsively assign to the relay base station an IP address that is locally routable within the core network, thus enabling the relay base station to communicate on the core network.

At this point, the relay base station 34 could then function fully as a base station on the core network 10, serving WCDs 38 and thus enabling the WCDs 38 to engage in communications on transport network 18, albeit with the relay-WCD providing the relay base station with wireless backhaul connectivity. In particular, as noted above, control-plane and user-plane communications between the relay base station 34 and various core network entities would flow via the communication interface 36 between the relay base station 34 and the relay-WCD 32, via the air interface between the relay-WCD 32 and the donor base station 12, and via a bearer between the donor base station 12 and the relay-gateway system 14.

By way of example, when an end-user WCD 38 detects coverage of the relay base station 34, the end-user WCD could connect with the relay base station 34 and could then engage in an attach process in which the end-user WCD transmits an attach message to the relay base station. In order to pass that attach message along to the MME 20 for handling, the relay base station could then forward the attach message via the communication interface 36 to the relay-WCD 32 and, and the relay-WCD could forward the attach message via the donor base station to the relay-gateway system 14, which could in turn forward the attach message via the core network to the MME for handling. Given that this is a conventional WCD attachment, the MME could then engage in further signaling with the relay base station (through a similar path via the relay-WCD) and with the conventional gateway system 16, to set up an APN connection for the WCD 38 to facilitate communication on the transport network 18.

As the relay base station thus serves one or more such WCDs 38, the relay base station may serve the WCDs 38 with communications of various types and at various times. And the relay base station and/or one or more other entities could track the types of these communications and when they occur.

As a general matter, the type of communication with which a base station serves a WCD could be indicated in various ways. For example, the type of communication could be indicated by a quality of service class indicator (QCI) of the bearer over which the communication occurs. For instance, when a WCD first attaches, the core network may establish for the WCD a best efforts bearer having a QCI of 8 or 9, for carrying general IP communication (such as web browsing, file transfer, and e-mail traffic). Therefore, communication occurring on a bearer of QCI 8 or 9 could be presumed to be general IP communication. Further, when a WCD places or receives a voice over IP (VoIP) call (if applicable), the core network may establish for the WCD a guaranteed-bit-rate (GBR) bearer having a QCI of 1 for carrying the voice traffic. Therefore, communication occurring on a bearer having QCI 1 could be presumed to be VoIP communication. And another example, the type of communication could be determined through deep packet inspection, possibly detecting the protocols used in packet communication to or from the WCD and/or reading signaling messages indicating initiation or completion of certain types of communications, for instance.

In operation, the relay base station, the EMS, and/or one or more other network entities could track times when the relay base station serves communications, possibly per communication type. For example, the relay base station could detect and log times (e.g., date/time stamps) of when it serves QCI 8 or 9 communication and times when it serves QCI 1 communication, among others. Alternatively or additionally, the relay base station could report its service of such communications, by communication type and time, to the EMS 40, and the EMS could thus log the times when the relay base station has served such communications.

In line with the discussion above, the relay-WCD in the arrangement of FIG. 1 could be configured to control when to release its APN connection with the relay-gateway system 14, based on inactivity on the communication interface 36 between the relay-WCD and the relay base station (e.g., based on absence of communication on that interface from the relay base station to the relay-WCD).

As noted above, for instance, in the absence of any actual control-plane or user-plane traffic to transmit, the relay base station could transmit periodic keepalive messages (e.g., ICMP Ping messages or the like) to the relay-WCD. An example period for such keepalive messages, without limitation, is 5 milliseconds. Further, the relay-WCD could be configured to determine when there is an absence of communication from the relay base station on the communication interface for a threshold inactivity period that is set to a length well more than the keepalive period. For instance, without limitation, the keepalive period could be about 5 milliseconds, and the threshold inactivity period could be on the order of tens of seconds.

Upon detecting such absence of communication on interface 36 from the relay base station, the relay-WCD could then release its APN connection with the core network and could further release the APN connection that was established for the relay base station. To release each such APN connection, the relay-WCD could transmit to the donor base station a detach request message designating the APN connection to be released, and that detach request would pass to the MME 20, which would engage in signaling to coordinate or trigger release of the APN, including teardown of any associated bearers, release of any associated IP address, and deletion of any associated context records.

In accordance with the discussion above, the relay-WCD will dynamically set the threshold inactivity period that it uses for gauging the absence of communication on the communication interface 36 between the relay-WCD and the relay base station. In particular, the relay-WCD will dynamically set that threshold inactivity period based on a consideration of history of communications with which the relay base station has served one or more WCDs.

For instance, as discussed above, at times of day when the relay base station tends to serve such communications and perhaps when the relay base station tends to serve high-priority communications (e.g., voice calls) in particular, the relay-WCD could dynamically apply a longer threshold inactivity period, to help minimize downtime resulting from the relay base station going offline just briefly (e.g., if the relay base station gets rebooted or the like). Whereas, at times of day when the relay base station tends to not serve such communications or perhaps when the relay base station tends to not serve high-priority communications, the relay-WCD could dynamically apply a shorter threshold inactivity period, to help conserve network resources by allowing quicker release of the relay-WCD's APN connection in response to absence of communication on communication interface 36.

The relay-WCD could determine in various ways what times of day (e.g., a range of times per day or on particular days of the week) when the relay base station tends to serve such communications.

By way of example, the relay base station could report to the relay-WCD over a sync/control channel on the communication interface 36. For instance, the relay base station could report to the relay-WCD each time the relay base station serves a WCD with a communication, possibly indicating the type of the communication. And the relay-WCD could log such occurrences along with timestamps and could statistically roll up the logged data to identify times of day when the relay base station has most often served communications, possibly high-priority communications, and perhaps times of day when the relay base station has rarely served such communications. Alternatively, the relay base station could itself log such data and timestamps, determine the times of day when the relay base station tends to serve such communications or not, and could report those times of day accordingly to the relay-WCD.

And as another example, the relay base station could report such information to the EMS server 40, and the relay-WCD could receive reports from the EMS server. Similarly here, the EMS server could thus report to the relay-WCD times of day of the relay base station serving communications, possibly high priority communications, and the relay-WCD could roll up that data to determine times when the relay base station tends to serve such communications and times when the relay base station tends to not serve such communications. Or the EMS server could perform the analysis itself to determine such times and could report the determined times to the relay-WCD. Other examples are possible as well.

The relay-WCD could then use the determined times of day as a basis to dynamically set the threshold inactivity period that the relay-WCD would use for evaluating absence of communication on the communication interface with the relay base station, so as to determine when the relay-WCD should initiate release of the relay-WCD's APN connection with the core network. In an example implementation, for instance, the relay-WCD could be configured to apply a default threshold inactivity period (timer) and to increase the threshold inactivity period at times of day when the relay base station is most likely to serve communications, perhaps high-priority communications. Alternatively, the relay-WCD could more granularly correlate (i) extents of the relay base station tending to serve communications with (ii) threshold inactivity periods, and the relay-WCD could dynamically adjust the threshold inactivity period accordingly.

Further, in another implementation, another entity such as the relay base station or the EMS server could carry out the process of determining the threshold inactivity periods that the relay-WCD should apply at various times of day based on the history of communications served by the relay base station, and that other entity could report to the relay-WCD the determined threshold inactivity period to apply per time of day. In this implementation, the relay-WCD could then apply the reported threshold inactivity periods per the indicated times of day, as another way to dynamically control the threshold inactivity period.

As example values, without limitation, the relay base station could be set to transmit a keepalive message to the relay-WCD every 5 milliseconds, the relay-WCD could be set to apply a threshold inactivity period of 60 seconds at times of day when the relay base station tends to serve high-priority communications such as VoIP calls, and the relay-WCD could be set to apply a longer threshold inactivity period of 90 seconds at times of day when the relay base station does not tend to serve such high-priority communications.

Figure 2:
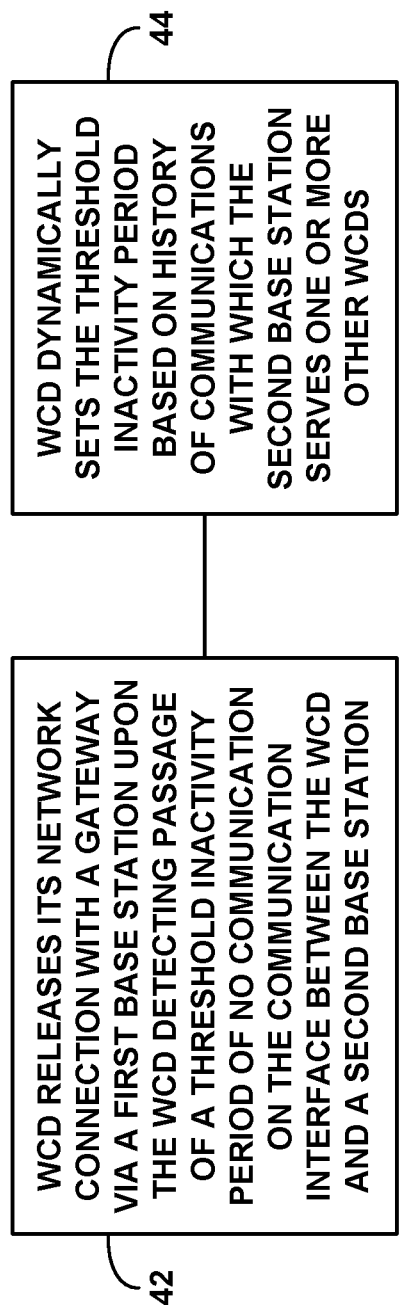
FIG. 2 is a depiction of operations that can be carried out in accordance with the disclosure.

FIG. 2 is next a depiction of operations that can be carried out in accordance with this process, to control release of a network connection that a WCD has with a gateway of a core network, in a situation where the WCD is served by a first base station that provides the WCD with wireless connectivity to the core network, and where the WCD has a communication interface with a second base station and the WCD provides the second base station with backhaul connectivity to the core network via the first base station. In particular, the WCD here could operate as a relay-WCD as discussed above. Further, the WCD and the second base station could be separate devices, and the communication interface between the WCD and the second base station could comprise an Ethernet interface.

As shown in FIG. 2, at block 42, the WCD releases the WCD's network connection with the gateway upon (e.g., in response to) the WCD detecting passage of a threshold inactivity period of no communication on the communication interface between the WCD and the second base station. Further, at block 44, the WCD dynamically sets the threshold inactivity period based on history of communications with which the second base station serves one or more other WCDs. In practice, the dynamic setting of the threshold inactivity period could happen over time, and the act of the WCD detecting the passage of the threshold inactivity period of no communication on the communication interface between the WCD and the second base station could be based on a current setting of the threshold inactivity period.

As discussed above, the act of the WCD dynamically setting the threshold inactivity period based on history of communications with which the second base station serves one or more other WCDs could be based on times of day when the second base station has served the communications. For instance, the WCD could receive from the second base station, and/or from an EMS of the core network, one or more reports of the second base station having served the communications, and the WCD could use those reports to facilitate dynamically setting the threshold inactivity period based on times of day when the second base station has served the communications.

Further, as noted above, the act of the WCD dynamically setting the threshold inactivity period based on history of communications with which the second base station serves one or more other WCDs could involve the WCD receiving from an entity of the core network an indication of the threshold inactivity period determined based on history of communications with which the second base station serves one or more other WCDs, and the WCD setting the threshold inactivity period to be the indicated threshold inactivity period.

In addition, as discussed above, the act of the WCD dynamically setting the threshold inactivity period based on history of communications with which the second base station serves one or more other WCDs could involve determining a recurring time of day (e.g., happening at about the same time each day) when the second base station tends to serve a threshold great extent of communications, perhaps more than a predefined threshold quantity of communications, where the threshold quantity is deemed to be sufficient to justify applying an increased threshold inactivity period. And the act could then involve, responsive to the determining, increasing the threshold inactivity period at the recurring time of day.

Alternatively or additionally, the act of the WCD dynamically setting the threshold inactivity period based on history of communications with which the second base station serves one or more other WCDs could involve determining a recurring time of day when the second base station tends to serve a communications having at least a threshold high-priority service level (e.g., any guaranteed bit rate communications, or perhaps specifically any VoIP communications). And the act could then involve, responsive to the determining, increasing the threshold inactivity period at the recurring time of day.

Further, as discussed above, the act of the WCD releasing the WCD's network connection with the gateway upon detecting by the WCD the passage of the threshold inactivity period of no communication on the communication interface between the WCD and the second base station could involve the WCD transmitting to the first base station a detach request message, which could trigger release of the WCD's connection with the gateway. In practice, for instance, the WCD's connection with the gateway could comprise a bearer for carrying data communication to and from the WCD between the first base station and the gateway, and the act of the WCD transmitting to the first base station the detach request message could trigger signaling in the core network to release that bearer. Further, the core network could store at least one context record for the WCD's connection with the gateway, and the act of the WCD transmitting to the first base station the detach request message could trigger signaling in the core network to delete each such context record.

Figure 3:
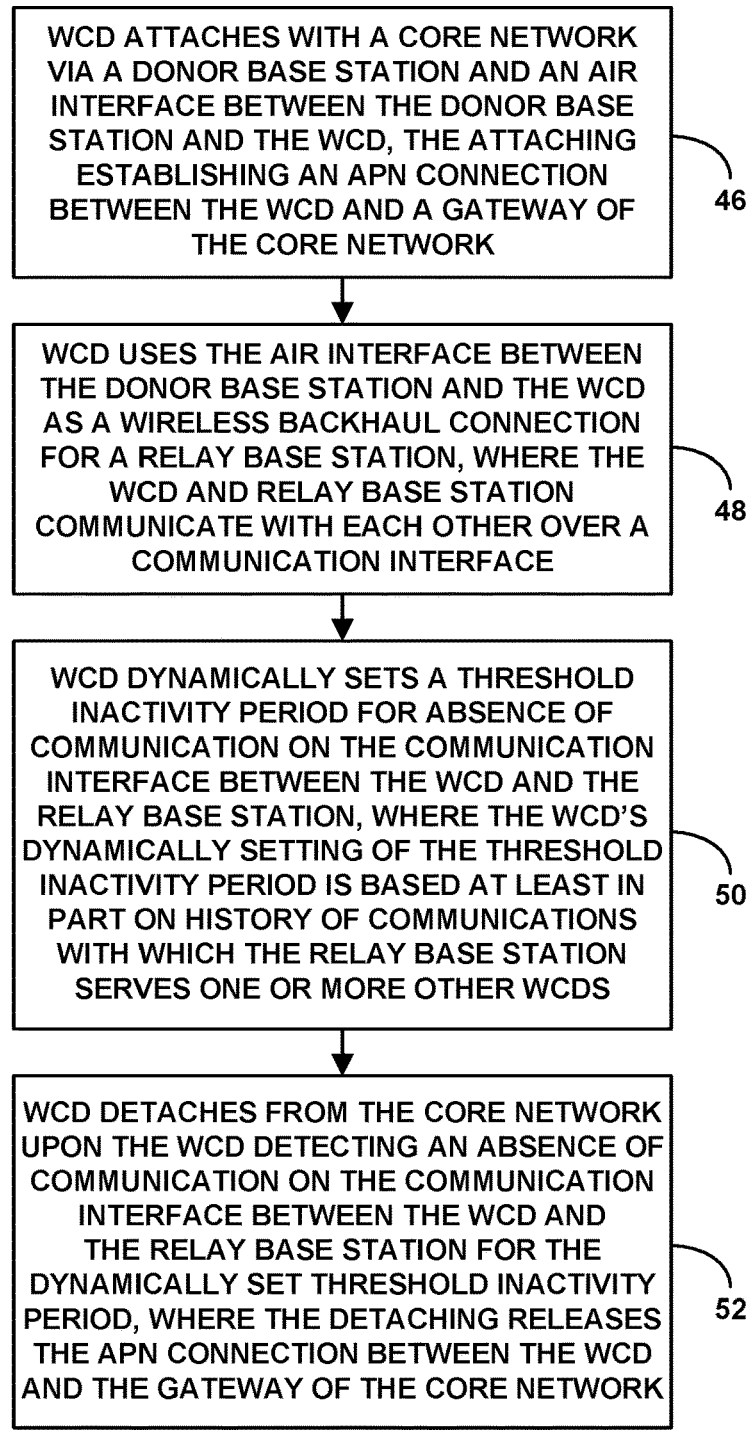
FIG. 3 is a flow chart depicting operations that can be carried out in accordance with the disclosure.

FIG. 3 is next a flow chart depicting a method that can be carried out in line with the discussion above. As shown in FIG. 3, at block 46, the method includes a WCD attaching with a core network via a donor base station and an air interface between the donor base station and the WCD, where the attaching establishes an APN connection between the WCD and a gateway of the core network. At block 48, the method then includes the WCD using the air interface between the donor base station and the WCD as a wireless backhaul connection for a relay base station, where the WCD and relay base station communicate with each other over a communication interface.

Further, at block 50, the method includes the WCD dynamically setting a threshold inactivity period for absence of communication on the communication interface between the WCD and the relay base station, where the WCD's dynamically setting of the threshold inactivity period is based at least in part on history of communications with which the relay base station serves one or more other WCDs. And at block 52, the method includes the WCD detaching from the core network upon the WCD detecting an absence of communication on the communication interface between the WCD and the relay base station for the dynamically set threshold inactivity period, where the detaching releases the APN connection between the WCD and the gateway of the core network.

As discussed above, in this method, the APN connection could provide for data communication locally within the core network (as compared with an APN connection that might provide for data communication on an external transport network for instance). Further, the act of attaching could result in establishing for the WCD at least one bearer connection between the WCD and the gateway via the donor base station, and establishing in the core network at least one context record for the WCD. And the act of detaching could result in releasing the at least one bearer between the WCD and the gateway and deleting of the at least one context record for the WCD.

In addition, the act of the WCD dynamically setting the threshold inactivity period based on history of communications with which the relay base station serves one or more other WCDs could be based on times of day when the relay base station has served the communications. For instance, as discussed above, this could involve determining a recurring time of day when the relay base station tends to serve a threshold great extent of communications, and responsively increasing the threshold inactivity period at the recurring time of day. Alternatively or additionally, this could involve determining a recurring time of day when the relay base station tends to serve a communications having at least a threshold high-priority service level, and responsively increasing the threshold inactivity period at the recurring time of day.

Figure 4:
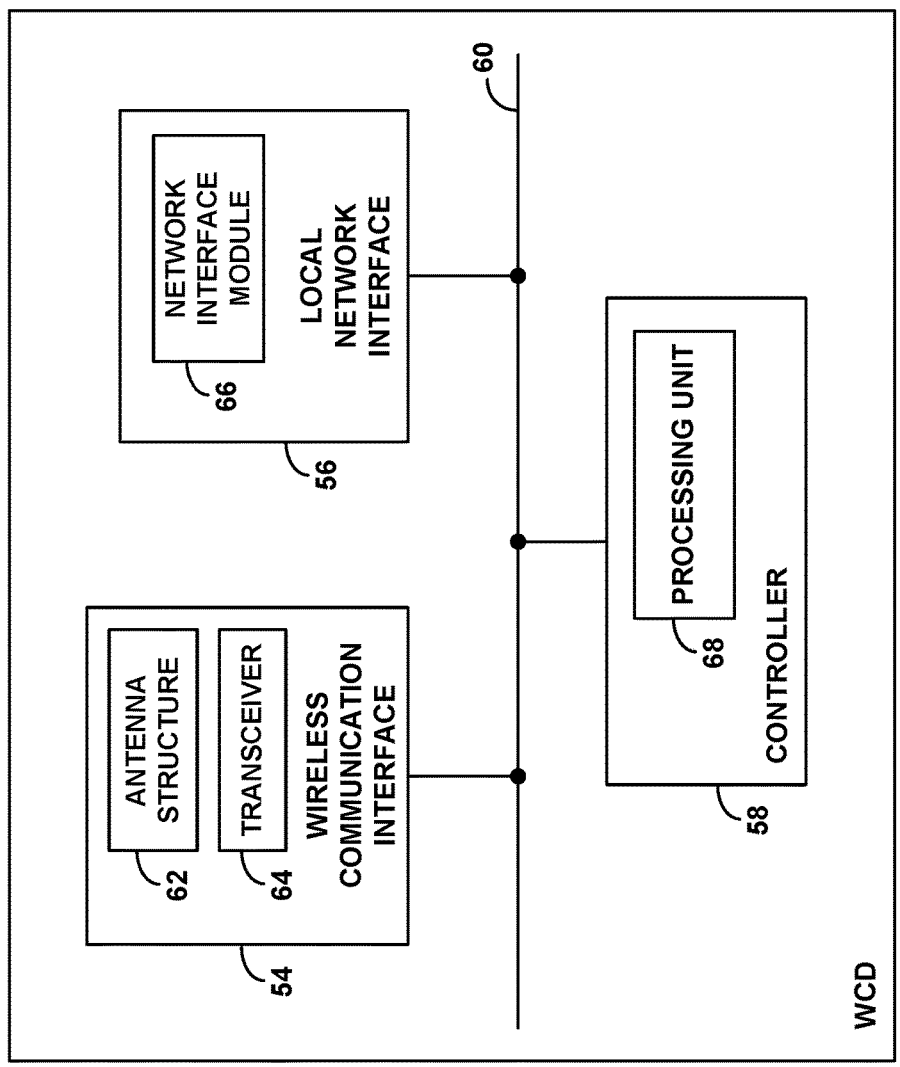
FIG. 4 is a simplified block diagram of an example WCD operable in the disclosed system.

Finally, FIG. 4 is a simplified block diagram of a WCD, showing some of the components that such an entity could include to operate as a relay-WCD as discussed above for instance. As shown, the WCD includes a wireless communication interface 54, a local network interface 56, and a controller 58, which could be integrated together in various ways and/or could be communicatively linked with each by a system bus or other communication mechanism 60 as shown.

The wireless communication interface 54 could include an antenna structure 62 and transceiver 64, through which to communicate over the air interface with a donor base station. The local network interface 56 could include a network interface module (e.g., Ethernet interface module) 66 for communicating with a relay base station. And the controller 56 could include a processing unit 68 (e.g., one or more microprocessors or the like) programmed with instructions to cause the WCD to carry out various operations as described above for instance.

As such, the WCD could attach with the core network, with the attaching resulting in establishment of a network connection between the WCD and the gateway. Further, the WCD could dynamically set a threshold inactivity period based on history of communications with which the relay base station serves one or more other WCDs. And still further, the WCD could detect absence of communication on the local communication interface between the WCD and the relay base station for the dynamically set inactivity period, and, responsive to the detecting, could detach from the core network, with the detaching resulting in release of the network connection between the WCD and the gateway.

Various features discussed above could be applied in this context as well, and vice versa. For example, in practice, the WCD could receive via the local communication interface from the relay base station one or more reports of communications served by the relay base station, and the WCD could use the received one or more reports as a basis to dynamically set the threshold inactivity period.

Exemplary embodiments have been described above. Those skilled in the art will understand, however, that changes and modifications may be made to these embodiments without departing from the true scope and spirit of the invention.

What is claimed is:

1. A method for controlling release of a network connection that a wireless client device (WCD) has with a gateway of a core network, wherein the WCD is served by a first base station that provides the WCD with wireless connectivity to the core network, and wherein the WCD has a communication interface with a second base station and the WCD provides the second base station with backhaul connectivity to the core network via the first base station, the method comprising:

releasing by the WCD the WCD's network connection with the gateway upon detecting by the WCD a passage of a threshold inactivity period of no communication on the communication interface between the WCD and the second base station; and dynamically setting by the WCD the threshold inactivity period based on history of communications with which the second base station serves one or more other WCDs, wherein dynamically setting by the WCD the threshold inactivity period based on history of communications with which the second base station serves one or more other WCDs is based on times of day when the second base station has served the communications.

2. The method of claim 1, further comprising receiving by the WCD from the second base station one or more reports of the second base station having served the communications, to facilitate dynamically setting by the WCD the threshold inactivity period based on times of day when the second base station has served the communications.

3. The method of claim 1, further comprising receiving by the WCD from an element management system (EMS) of the core network one or more reports of the second base station having served the communications, to facilitate dynamically setting by the WCD the threshold inactivity period based on times of day when the second base station has served the communications.

4. The method of claim 1, wherein dynamically setting by the WCD the threshold inactivity period based on history of communications with which the second base station serves one or more other WCDs comprises:
receiving by the WCD from an entity of the core network an indication of the threshold inactivity period determined based on history of communications with which the second base station serves one or more other WCDs; and
setting by the WCD the threshold inactivity period to be the indicated threshold inactivity period.

5. The method of claim 1, wherein dynamically setting by the WCD the threshold inactivity period based on history of communications with which the second base station serves one or more other WCDs comprises:
determining a recurring time of day when the second base station tends to serve a threshold great extent of communications; and
responsive to the determining, increasing the threshold inactivity period at the recurring time of day.

6. The method of claim 1, wherein dynamically setting by the WCD the threshold inactivity period based on history of communications with which the second base station serves one or more other WCDs comprises:
determining a recurring time of day when the second base station tends to serve communications having at least a threshold high-priority service level; and
responsive to the determining, increasing the threshold inactivity period at the recurring time of day.

7. The method of claim 1, wherein releasing by the WCD the WCD's network connection with the gateway upon detecting by the WCD the passage of the threshold inactivity period of no communication on the communication interface between the WCD and the second base station comprises:
transmitting by the WCD to the first base station a detach request message, which triggers release of the WCD's connection with the gateway.

8. The method of claim 7, wherein the WCD's connection with the gateway comprises a bearer for carrying data communication to and from the WCD between the first base station and the gateway, and wherein transmitting by the WCD to the first base station the detach request message triggers signaling in the core network to release the bearer.

9. The method of claim 7, wherein the core network stores at least one context record for the WCD's connection with the gateway, and wherein transmitting by the WCD to the first base station the detach request message triggers signaling in the core network to delete the at least one context record.

10. The method of claim 1, wherein the WCD and the second base station are separate devices, and wherein the communication interface between the WCD and the second base station comprises an Ethernet interface.

11. A method comprising:
attaching, by a wireless client device (WCD), with a core network via a donor base station and an air interface between the donor base station and the WCD, wherein the attaching establishes an access point name (APN) connection between the WCD and a gateway of the core network;
using, by the WCD, the air interface between the donor base station and the WCD as a wireless backhaul connection for a relay base station, wherein the WCD and relay base station communicate with each other over a communication interface;
dynamically setting, by the WCD, a threshold inactivity period for absence of communication on the communication interface between the WCD and the relay base station, wherein dynamically setting the threshold inactivity period is based at least in part on times of day when the relay base station has served one or more other WCDs with communications; and
detaching, by the WCD, from the core network upon detecting by the WCD absence of communication on the communication interface between the WCD and the relay base station for the dynamically set threshold inactivity period, wherein the detaching releases the APN connection between the WCD and the gateway of the core network.

12. The method of claim 11, wherein the APN connection provides for data communication locally within the core network.

13. The method of claim 11,
wherein the attaching results in establishing for the WCD at least one bearer between the WCD and the gateway via the donor base station, and
wherein the detaching results in releasing the at least one bearer between the WCD and the gateway.

14. The method of claim 11,
wherein the attaching results in establishing in the core network at least one context record for the WCD, and
wherein the detaching results in deleting the at least one context record for the WCD.

15. The method of claim 11, wherein dynamically setting by the WCD the threshold inactivity period based at least in part on times of day when the relay base station has served one or more other WCDs with communications comprises:
determining a recurring time of day when the relay base station tends to serve a threshold great extent of communications; and
responsive to the determining, increasing the threshold inactivity period at the recurring time of day.

16. The method of claim 11, wherein dynamically setting by the WCD the threshold inactivity period based at least in part on times of day when the relay base station has served one or more other WCDs with communications comprises:
determining a recurring time of day when the relay base station tends to serve a communications having at least a threshold high-priority service level; and
responsive to the determining, increasing the threshold inactivity period at the recurring time of day.

17. A wireless client device (WCD) configured to control connection of the WCD with a gateway of a core network via a donor base station that serves the WCD, wherein the WCD comprises:
wireless communication interface through which to engage in communication over an air interface with the donor base station;
a local communication interface through which to communicate with a relay base station, wherein the WCD is configured to provide the relay base station with wireless backhaul connectivity to the core network via the air interface; and a controller comprising a programmed processing unit configured to cause the WCD to carry out operations including (i) attaching with the core network, wherein the attaching establishes a network connection between the WCD and the gateway, (ii) dynamically setting a threshold inactivity period based on times of day when the relay base station has served one or more other WCDs with communications, (iii) detecting absence of communication on the local communication interface between the WCD and the relay base station for the dynamically set inactivity period, and (iv) responsive to the detecting, detaching from the core network, wherein the detaching releases the network connection between the WCD and the gateway.

18. The WCD of claim 17, wherein the operations further include receiving from via the local communication interface from the relay base station one or more reports of communications served by the relay base station, and using the received one or more reports as a basis to dynamically set the threshold inactivity period.

* * * * *